United States Patent

Johnson

[15] 3,693,905
[45] Sept. 26, 1972

[54] DISPLAY FOR FILAMENTARY PRODUCT WITH MUTUALLY ADJACENT SEGMENTS HAVING CONTRASTING COLORS

[72] Inventor: Paul C. Johnson, Spirit Lake, Iowa

[73] Assignee: Berkley & Company Inc., Spirit Lake, Iowa

[22] Filed: July 26, 1971

[21] Appl. No.: 166,133

[52] U.S. Cl. ............. 242/159, 206/46 Y, 206/52 W, 206/59 A, 206/78 R, 242/1, 242/47
[51] Int. Cl. ............................................. B65h 55/00
[58] Field of Search ............ 242/159, 164, 165, 166, 174–178, 242/47, 54, 1; 206/52 W, 59 A, 82, 64, 78 B, 46 Y, 78 R

[56] References Cited

UNITED STATES PATENTS

| | | | |
|---|---|---|---|
| 2,639,097 | 5/1953 | Scott, Jr. | 242/159 X |
| 2,738,176 | 3/1956 | Hargenrater | 242/166 X |

FOREIGN PATENTS OR APPLICATIONS

| | | | |
|---|---|---|---|
| 781,101 | 8/1957 | Great Britain | 206/59 A |

*Primary Examiner*—Stanley N. Gilreath
*Attorney*—Orrin M. Haugen

[57] ABSTRACT

Means for winding and displaying a portion of a continuous elongated translucent filament with mutually adjacent segments having contrasting colors upon the core of a laterally flanged spool structure comprising winding an initial predetermined portion of the elongated filament upon the core to a substantially completed extent of fill, and then enveloping the outer cylindrical surface of said substantially completely filled spool with an opaque film having a highly reflective outer surface. Thereafter, the winding of the elongated filament is continued, with the filament being wound helically about the outer surface of the opaque film until the core surface between the inner opposed surfaces of the lateral flanges is substantially covered with a single winding layer only of the elongated filament, thus presenting striations of contrasting color between the inner surfaces of the lateral flanges.

4 Claims, 2 Drawing Figures

PATENTED SEP 26 1972   3,693,905

INVENTOR.
Paul C. Johnson
BY
Orrin M. Haugen
ATTORNEY

DISPLAY FOR FILAMENTARY PRODUCT WITH MUTUALLY ADJACENT SEGMENTS HAVING CONTRASTING COLORS

BACKGROUND OF THE INVENTION

The present invention relates generally to an improved means for winding and displaying a portion of a continuous elongated translucent filament with mutually adjacent segments having contrasting colors, and more particularly to a display system for such a filament upon the core of a laterally flanged spool structure. The concept of the present invention provides a technique for displaying a continuous elongated translucent filament upon the core of a laterally flanged spool in such a manner that the segmentally colored nature of the filament is readily apparent to even a casual observer.

Elongated filaments with mutually adjacent segments having contrasting colors are in reasonably wide-spread use for a variety of applications. One specific application is in fishing line wherein the user wishes to gauge the length of line extending outwardly from the rod with reasonable accuracy, and without the need for expensive or cumbersome measuring apparatus. For example, monofilament fish line may be prepared wherein successive increments of the line is distinctly colored with a different and contrasting color. When using such a line, the fisherman may then engage in his fishing activity in a repeatable fashion, that is, with the desired length of line extending outwardly from the fishing rod. Such lines find use by fishermen in either trolling or still-fishing in deep water.

SUMMARY OF THE INVENTION

In accordance with the present invention, therefore, a continuous length of elongated translucent filament with mutually adjacent segments having contrasting colors is wound upon the core of a laterally flanged spool structure. In the initial winding operation, a certain predetermined portion of the elongated filament is wound upon the core until the filling operation is substantially completed. At this point, the outer surface of the substantially completed fill is enveloped with an opaque film having a highly reflective surface. At this point, winding is continued by bringing the filament to be wound out around the outer surface of the opaque film, whereupon the winding operation is continued about the surface of the opaque film. This continuation of the winding operation is conducted in a regular and level-winding mode until the spool core surface between the inner opposed surfaces of the lateral flanges is substantially covered with a single winding layer only of the continuous elongated filament. In this fashion, a plurality of striations of contrasting colors are formed on the surface of the spool across the extent thereof. The casual observer is able to detect the nature of the package upon a casual glance, since the striations disclose and suggest the nature of the product wound upon the spool.

Therefore, it is a primary object of the present invention to provide an improved technique for the winding and display of a continuous elongated translucent filament with mutually adjacent segments having contrasting colors.

It is a further object of the present invention to provide an improved system for displaying such an elongated filament upon the core of a laterally flanged spool, wherein an opaque film is disposed immediately beneath the outer-most wind, so as to provide a plurality of mutually adjacent striations of contrasting color.

It is yet a further object of the present invention to provide an improved display mechanism for the winding and display of elongated filament with mutually adjacent segments having contrasting colors wherein the initial portion of the line filling the spool is wound upon the spool core, and wherein this portion is covered with an opaque film having a highly reflective surface, this film being covered by one complete and continuing wind of helically disposed line arranged in the area between opposed laterally flanged spools.

Other and further objects of the present invention will become apparent to those skilled in the art upon a study of the following specification, appended claims, and accompanying drawing.

DESCRIPTION OF THE PREFERRED EMBODIMENT

Figure 1:
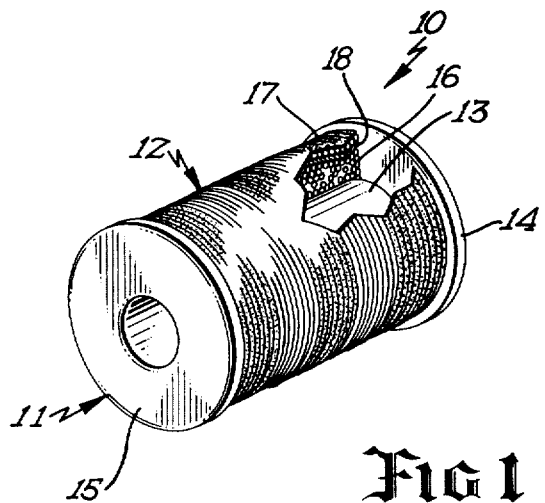
FIG. 1 is an isometric view of a spool containing a fill of a continuous elongated filament with mutually adjacent segments having contrasting colors, the arrangement being prepared in accordance with the present invention.
Figure 2:
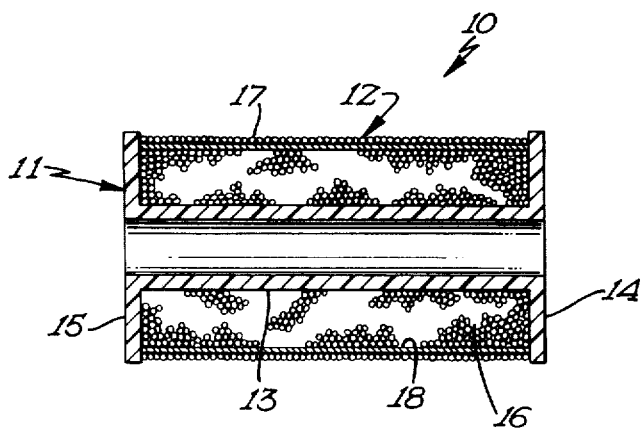
FIG. 2 is a vertical sectional view taken through the diameter of the structure of FIG. 1, and illustrating the arrangement of the spool structure, in combination with the wound line.

In accordance with the preferred embodiment of the present invention, a display assembly generally designated 10 is illustrated, with the assembly including or incorporating a spool structure 11 having a wrap of line 12 disposed thereabout. The spool 11 includes a core member 13, with the core being flanked by a pair of laterally disposed flanges 14 and 15. The line 12 is a continuous length of elongated translucent filament with mutually adjacent segments having contrasting colors, each of the segments having a regular and predetermined length. In a typical embodiment incorporating monofilament fish line, a line will be provided with incremental segments of 10-foot lengths, for example, thus rendering a reading of the depth simple and expeditious.

The line is wound upon the spool in two successive portions, with the inner-most portion being shown at 16, and with the outer portion being shown at 17. An intermediate opaque film having a highly reflective surface separates the windings 16 from the windings 17, the layer being shown at 18. Preferably, the opaque film is a film of aluminum foil, which provides the opaque structure with a highly reflective surface. The winding is preferably regular and level in its extent, thus forming a true cylindrical fill of line on the spool. It is important to the concept of the present invention that the outer-most winding 17 be regular, thus providing a plurality of striations, with mutually adjacent striations having contrasting colors. With regular winding patterns, these striations have a substantially uniform width from one lateral extent of the spool to the other.

The opaque film with the highly reflective surface provides a backing for the translucent filament which renders the nature of the product readily apparent. The appearance of that portion of the winding shown at 16 is bland and without definition. The materials, being translucent, provide no definite color pattern, even though that portion of the line may be wound in a regular helically arranged pattern. However, the interpositioning of the opaque layer with a reflective surface provides an outer winding layer having sharply contrasting colors, consistent with the colors of the filament. It is therefore possible to provide an attractive and inexpensive packaging concept for this type of material.

In order to obtain a readily recognizable pattern, it has been found that the axial length of the individual striations should be small relative to the filled diameter of the spool. Such an arrangement enhances the appearance of the structure, and furthermore provides a more readily recognizable pattern representing the nature of the product. It will be appreciated, of course, that for a spool having an outer filled diameter of approximately 2½ inches, a striation width of between one-eighth inch and one-half inch is desirable, with the spool having an axial length of about 2½ inches. Such a winding pattern enhances the identification of the material being displayed.

I claim:

1. The method of winding and displaying a portion of a continuous elongated translucent filament with mutually adjacent segments having contrasting colors upon the core of a laterally flanged spool structure comprising the steps of:
   a. winding an initial predetermined portion of said elongated filament upon said core to a substantially completed extent of fill; then
   b. enveloping the outer cylindrical surface of said substantially completed fill with an opaque film having a highly reflective surface; and thereafter
   c. continuing said winding operation continuously and helically about the outer surface of said opaque film until the film surface between the inner opposed surfaces of said lateral flanges is substantially covered with a single winding layer only of said continuous elongated filament.

2. The method as set forth in claim 1 being particularly characterized in that said opaque film is aluminum foil.

3. The method as set forth in claim 1 being particularly characterized in that said elongated translucent filament is a monofilament fabricated from nylon.

4. Display assembly means for displaying a portion of a continuous elongated translucent filament with mutually adjacent segments having contrasting colors and comprising, in combination:
   a. a laterally flanged spool structure having a generally cylindrical core extending between the inner opposed surfaces of said lateral flanges;
   b. a continuous wrap of filament loaded upon said spool, and including an inner winding portion and an outer winding portion;
   c. an opaque film having a highly reflective surface disposed about the outer surface of said inner windings; and
   d. said outer winding portion comprising a single and continuous wind of said elongated filament disposed outwardly of said opaque film, said outer winding extending between the inner opposed surfaces of said lateral flanges.

* * * * *